W. W. HINKLE.
Clearer for Coffee and Tea Pots
No. 208,391. Patented Sept. 24, 1878.
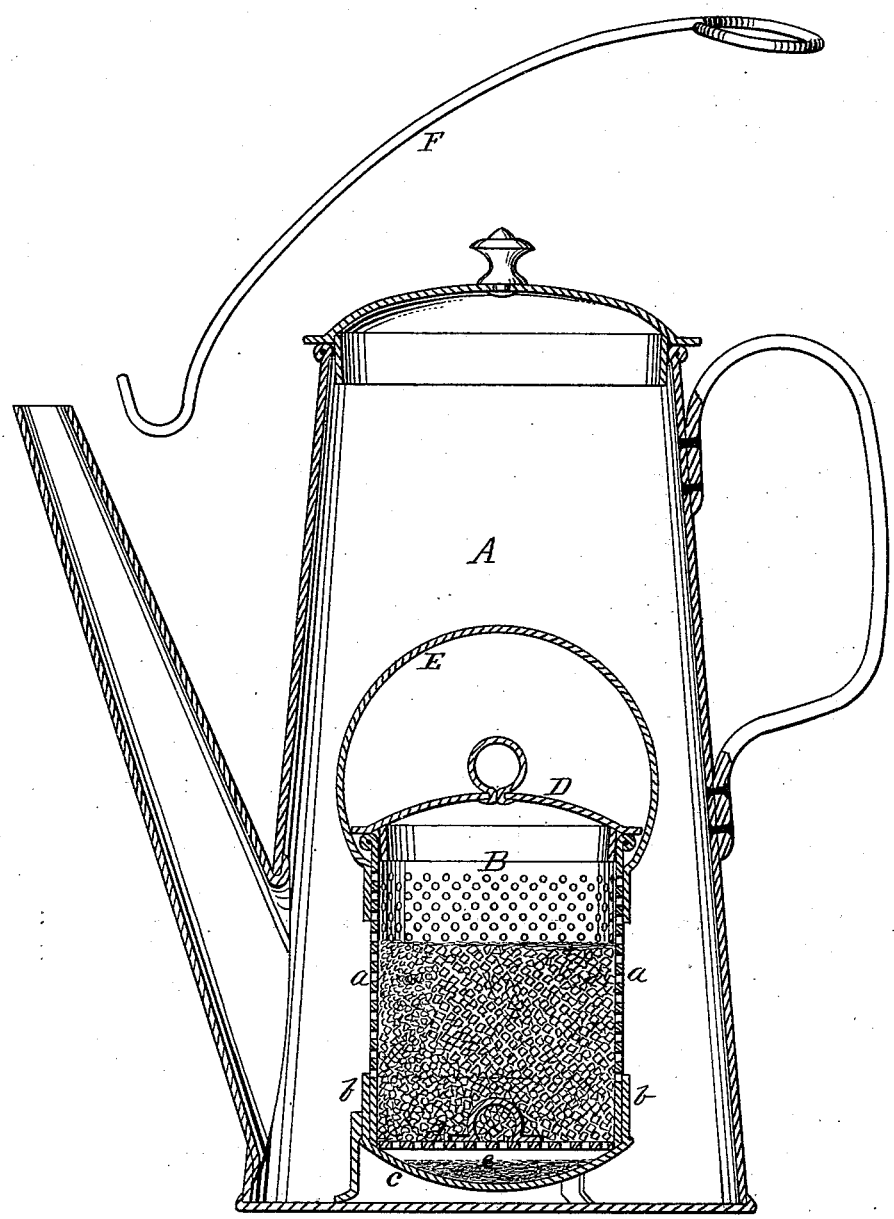
WITNESSES
INVENTOR
Wilber W. Hinkle,
by O. W. Anderson,
ATTORNEY

UNITED STATES PATENT OFFICE.

WILBER W. HINKLE, OF HOOD'S MILLS, MARYLAND.

IMPROVEMENT IN CLEARERS FOR COFFEE AND TEA POTS.

Specification forming part of Letters Patent No. 208,391, dated September 24, 1878; application filed September 7, 1878.

*To all whom it may concern:*

Be it known that I, WILBER W. HINKLE, of Hood's Mills, in the county of Carroll and State of Maryland, have invented a new and valuable Improvement in Clearers for Coffee and Tea; and I do hereby declare that the following is a full, clear, and exact description of the construction and operation of the same, reference being had to the annexed drawings, making a part of this specification, and to the letters and figures of reference marked thereon.

The drawing is a representation of a vertical central section of this invention.

This invention has relation to means for clearing coffee, tea, and similar decoctions, so that subsequent straining will not be necessary; and it consists in the construction and novel arrangement of an independent vessel of small size, having perforated sides and recessed bottom, detachable false bottom, lid, and bail, said vessel being adapted to be placed, with its contents of ground coffee or other articles, upon the bottom of any ordinary vessel in which coffee is to be prepared.

In the accompanying drawing, the letter A indicates an ordinary coffee-pot, and B the independent clearer-vessel placed inside the same, and resting upon its bottom. This vessel is constructed of sheet metal, tin being preferred. Its side wall, $a$, is perforated for a certain distance from the top, as shown in the drawing, and below this part, or at its lower portion, the side wall is made entire, or without perforations, as a guard, $b$. The bottom $c$ is concave or recessed, and above it is placed, upon a suitable bearing or ledge, a false bottom, $d$, which is perforated. The recessed bottom $c$ is made without perforations, and is designed to retain whatever may fall into it through the straining false bottom, which acts as a check to prevent the fallen dregs from rising again into the main chamber C. D represents the lid, and E the bail, whereby the clearer is let into the coffee-pot or vessel containing the water, and removed therefrom when the decoction is made, a bent hook, F, serving as a means of handling the same without scalding the fingers by the steam.

The operation of this device is as follows: Coffee is rendered thick or muddy by the dregs or finer particles of the grounds, which become disseminated through it by the action of the water and heat. In this clearer these finer particles, as the water begins to act upon the ground coffee, sift through and around the larger particles or grounds, falling toward the bottom or dreg chamber, $e$. In order to prevent these particles from coming through the perforated side wall, it is made in its lower portion, where they would be liable to come in contact with it in sliding over the larger grains, without perforations, as indicated at $b$. In this manner the dregs are guided into the bottom chamber, $e$, through the false bottom $d$, which seems to exert an attractive force upon these particles, and prevents them from rising again into the main chamber, whence they might enter the coffee. The ground coffee is put in the main chamber only, resting upon the false bottom, as indicated in the drawings. When the coffee is made the clearer is lifted out of the vessel, and the coffee-decoction will be found perfectly clear and bright. The larger grounds, being separated from the dregs, are clean and better adapted for the household uses to which they are applied than when they are mixed with the dregs.

I am well aware that it is not new to use perforated coffee-holders in coffee-pots, and therefore I do not claim such invention, broadly.

What I claim, and desire to secure by Letters Patent, is—

A coffee-clearer consisting of the independent vessel B, having perforated side wall, $a$, imperforate guard $b$ at the lower portion of said side wall, recessed bottom or dreg chamber, $e$, perforated false bottom $d$, lid D, and bail E, said clearer being adapted to be placed in or lifted out of any ordinary coffee-pot or boiling-vessel, substantially as specified.

In testimony that I claim the above I have hereunto subscribed my name in the presence of two witnesses.

WILBER W. HINKLE.

Witnesses:
M. P. CALLAN,
C. MERCER.